(12) United States Patent
Watanabe et al.

(10) Patent No.: US 9,587,665 B2
(45) Date of Patent: Mar. 7, 2017

(54) SCREW FASTENER

(71) Applicant: Miki Pulley Co., Ltd., Kawasaki-shi, Kanagawa (JP)

(72) Inventors: Tomio Watanabe, Sagamihara (JP); Hideo Sato, Yamato (JP)

(73) Assignee: Miki Pulley Co., Ltd., Kanagawa (JP)

( * ) Notice: Subject to any disclaimer, the term of this patent is extended or adjusted under 35 U.S.C. 154(b) by 152 days.

(21) Appl. No.: 14/616,802

(22) Filed: Feb. 9, 2015

(65) Prior Publication Data
US 2015/0240856 A1    Aug. 27, 2015

(30) Foreign Application Priority Data

Feb. 24, 2014 (JP) ................................. 2014-032675

(51) Int. Cl.
| | |
|---|---|
| *F16B 31/02* | (2006.01) |
| *F16B 31/00* | (2006.01) |
| *F16B 39/02* | (2006.01) |
| *F16B 19/02* | (2006.01) |

(52) U.S. Cl.
CPC .............. *F16B 31/00* (2013.01); *F16B 31/02* (2013.01); *F16B 39/028* (2013.01); *F16B 19/02* (2013.01)

(58) Field of Classification Search
CPC ......... F16B 31/00; F16B 31/02; F16B 39/028
USPC ........................................ 411/1, 8, 916, 960
See application file for complete search history.

(56) References Cited

U.S. PATENT DOCUMENTS

| | | | | |
|---|---|---|---|---|
| 4,205,572 A | * | 6/1980 | Weiner ...................... | B27B 5/32 30/388 |
| 4,445,876 A | * | 5/1984 | Entrup .................... | F16D 7/027 464/46 |
| 4,793,120 A | * | 12/1988 | Herzog ................. | B67B 3/2073 192/56.6 |
| 4,856,411 A | * | 8/1989 | Maurer ................... | F16B 21/16 91/1 |
| 5,148,652 A | * | 9/1992 | Herzog ................. | B65B 7/2835 451/451 |
| 5,447,362 A | * | 9/1995 | Nagano ................. | B60B 27/023 301/110.5 |
| 5,546,612 A | * | 8/1996 | Johnson ................. | A47K 13/10 16/342 |
| 5,653,481 A | * | 8/1997 | Alderman ............... | F16B 31/04 24/279 |
| 6,421,902 B1 | * | 7/2002 | Loffler .................... | F16B 31/02 29/407.02 |

FOREIGN PATENT DOCUMENTS

| | | |
|---|---|---|
| JP | H1047326 A | 2/1998 |
| JP | 2000027886 A | 1/2000 |

* cited by examiner

*Primary Examiner* — Gary Estremsky
(74) *Attorney, Agent, or Firm* — Marshall & Melhorn, LLC (57) ABSTRACT

Provided is a screw fastener provided with the function of a torque limiter which allows a high limit value to be set for the fastening torque without increasing the size thereof or the spring force of the spring member, and is easy to assemble and service. A multiple plate torque limiter is formed by a plurality of drive disk members (50) and a plurality of driven disk members (52) between a first member (10) and a second member (30), and the first member (10) and the second member (30) are detachably joined to each other by a retaining screw (22).

7 Claims, 7 Drawing Sheets

SCREW FASTENER

TECHNICAL FIELD

The present invention relates to a screw fastener, and in particular to a bolt or a nut provided with the function of a torque limiter that can set a maximum fastening torque.

BACKGROUND OF THE INVENTION

According to a known fastening bolt provided with the function of a torque limiter, the bolt comprises a head member provided with a tool engaging head configured to be engaged by a fastening tool, and a male thread member formed with a male thread and coupled to the head member via a ratchet mechanism. The ratchet mechanism firmly joins the head member and the male thread member against a relative rotation when the head member is turned in the unfastening direction. When the head member is turned in the fastening direction with a fastening torque less than a prescribed limit value (maximum fastening torque), the fastening torque is transmitted from the head member to the male thread member via a pair of mutually opposing slopes which are urged toward each other by a spring so that the fastening torque is transmitted from the head member to the male thread member owing to the frictional engagement between the mutually opposing slopes. However, when the head member is turned with a fastening torque greater than the prescribed limit value, the mutually opposing slopes start slipping relative to each other so that the male thread member is prevented from being threaded into the nut with a fastening torque exceeding the prescribed limit value. (See JP2000-27886A, for instance.)

According to a known fastening nut provided with the function of a torque limiter, the nut comprises a head member provided with a tool engaging head configured to be engaged by a fastening tool, and a female thread member formed with a female thread and engaging the head member via mutually opposing thrust surfaces frictionally engaging each other. A spring member interposed between the head member and the female member urges the mutually opposing thrust surfaces toward each other so that the torque in the fastening direction can be transmitted from the head member to the female thread member owing to the frictional engagement between the mutually opposing thrust surfaces, and when the head member is turned with a torque greater than a prescribed limit value, the thrust surfaces slip relative to each other so that the female thread member is prevented from being threaded onto a corresponding male thread with a fastening torque greater than the prescribed limit value. (See JP10-47326A, for instance.)

The conventional bolts and nuts provided with the function of a torque limiter were inevitably large in size because of the structural complexity, and were not configured to allow a large torque limit value to be set without unduly increasing the spring biasing force. Therefore, not only the size but also the difficulty of the assembly and servicing pose a serious problem.

SUMMARY OF THE INVENTION

A primary task of the present invention is to provide a screw fastener (such as a bolt and a nut) provided with the function of a torque limiter which allows a high torque limit value to be set for the fastening torque without unduly increasing the size thereof or the necessary spring force of the spring member, and is easy to assemble and service.

The present invention provides a screw fastener, comprising: a first member (10) provided with a tool engaging feature (14) for engaging a turning tool on an axial end, a central receiving bore (16) opening out at an opposite axial end and an annular end surface (18) surrounding an open end of the central receiving bore; a tubular second member (30) rotatably received in the central receiving bore (16), and having a fitting shaft portion (32) at an axial end thereof formed with a circumferential groove (34) on an outer circumference thereof and a male thread (40) formed in an opposite axial end thereof, the opposite axial end of the second member (30) being further provided with a fastening thread (42, 72) thereon, a disk supporting shaft portion (36) being formed on the second member between the fitting shaft portion (32) and the male thread (40); a retaining member (22) partly received in the circumferential groove (34) on the outer circumference of the fitting shaft portion (32) and engaged by the first member (10); a rod member (28) fixed to the first member (10) and extending axially toward the second member (30); a plurality of drive disk members (50) fitted on the outer circumferential surface of the disk supporting shaft portion (36) in an axially slidable and rotatable manner and having a through hole (50C) for axially passing the rod member (28) therethrough; a plurality of driven disk members (52) fitted on the outer circumferential surface of the disk supporting shaft portion (36) in an axially slidable and rotationally fast manner so as to axially alternate with the drive disk members (50); a spring member (58) disposed on the outer circumferential surface of the disk supporting shaft portion (36) to urge the drive disk members (50) and the driven disk members (52) toward the annular end surface (18) of the first member (10); and a spring retainer (62) threadably engaged by the male thread (40) of the second member (30) to apply a preload to the spring member (58).

Thus, a multiple plate torque limiter is formed by the drive disk members and the driven disk members between the first member and the second member, and the first member and the second member are detachably attached to each other via the retaining member so that a large limit torque value can be set without increasing the size of the torque limiter or increasing the biasing force of the spring member, and the ease of assembly and servicing of the screw fastener provided with the function of a torque limiter can be enhanced. The retaining member may consist of a retaining screw threaded into a threaded hole passed radially through the first member and having a free end slidably received in the circumferential groove.

Preferably, in this screw fastener, the tool engaging feature comprises a polygonal head, and the disk supporting shaft portion includes a polygonal shaft portion having a polygonal cross section which is conformal to the polygonal head so as to be engageable by a same tool as the polygonal head, the driven disk members being held rotationally fast by the second member by being fitted onto the polygonal shaft portion.

Thereby, the polygonal shaft portion serves the dual purposes of holding the driven disk members in a rotational fast manner and engaging a tool for directly turning the second member. Therefore, the second member may be turned by using the same tool as that used from turning the first member, and the need for preparing two separate tools can be eliminated.

Preferably, in this screw fastener, a thin sheet or a coating having a higher corrosion resistance than the material of the drive disk members and the driven disk members is placed on at least one of surfaces at which the drive disk members and the driven disk members come to contact with each other via the thin sheets.

According to this arrangement, seizure of the frictional surfaces due to corrosion or other causes can be avoided without using expensive oil impregnated material such as oil metal.

According to a preferred embodiment of the present invention, the fastening thread provided on the second member (30) comprises a female thread formed in a central bore formed on the opposite axial end of the second member (30). Alternatively, the fastening thread provided on the second member (30) may comprise a male thread formed on an axial extension formed on the opposite axial end of the second member (30).

According to a particularly preferred embodiment of the present invention, a disk retaining feature (36C) is provided on an outer periphery of a part of the disk supporting shaft portion (36) adjoining the fitting shaft portion (32) to restrict the drive and driven disk members (50, 52) against axial movement thereof toward the fitting shaft portion (32).

Thus, the drive and driven disk members may be retained on the second member before the second member is joined to the first member during the assembly process so that the assembly process can be facilitated. The opposing annular end surface of the first member may be provided with a suitable recess for receiving the disk retaining feature so that the annular end surface of the first member may provide a favorable frictional surface to the opposing driven disk member.

According to the screw fastener provided with the function of a torque limiter, a multiple plate torque limiter is formed by a plurality of drive disk members and a plurality of driven disk members between a first member and a second member, and the first member and the second member are detachably joined to each other by a retaining screw so that a high limit value can be set for the fastening torque without increasing the size thereof or the spring force of the spring member while permitting a great ease in the assembling and servicing work.

DESCRIPTION OF THE PREFERRED EMBODIMENT(S)

A fastening nut embodying the present invention is described in the following with reference to FIGS. 1 to 6.

Figure 4:
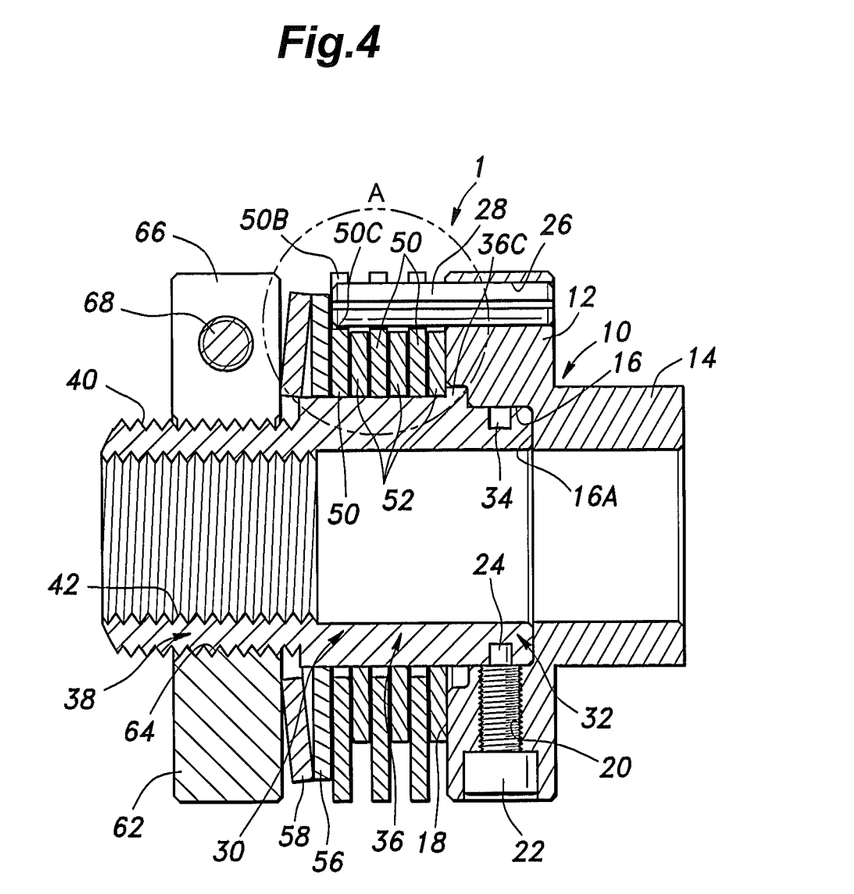
FIG. 4 is a sectional view of the embodiment taken along line IV-IV of FIG. 3.

The nut 1 of the illustrated embodiment includes a first member 10 having an annular main part 12 and a tool engaging feature 14 integrally projecting from an axial end (or the right end, as seen in FIG. 4) of the main part 12.

The tool engaging feature 14 is given with a hexagonal shape so that a spanner (not shown in the drawings) or other nut engaging tool may be detachably applied thereto. The main part 12 is formed with a central receiving bore 16 which opens out at the axial end (or the left end, as seen in FIG. 4) remote from the tool engaging feature 14. The central receiving bore 16 is provided with a circular cross section, and a bottom end thereof is formed with an annular shoulder 16A.

The end of the main part 12 remote from the tool engaging feature 14 (left end as seen in FIG. 4) or the end corresponding to the open end of the central receiving bore 16 defines an annular end surface 18 extending in the radially outward direction. The annular end surface 18 serves as a thrust surface extending perpendicularly to the central axial line.

Six axial through holes 26 are passed through the peripheral part of the main part 12 at a regular interval. An end (right end as seen in FIG. 4) of a spring pin 28 is press fitted into each through hole 26. Each spring pin 28 is thus fixed to the main part 12 at one end thereof, and extends axially in parallel with the central axial line toward the side of the second member 30 (or leftward as seen in FIG. 4) which will be described in the following.

The cylindrical fitting shaft portion 32 formed in the one end portion (right end portion as seen in FIG. 4) of the second member 30 is fitted into the central receiving bore 16, and abuts the annular shoulder 16A in a rotatable manner around the central axial line of the first member 10. The outer circumference of the cylindrical fitting shaft portion 32 is formed with an annular circumferential groove 34. The main part 12 is formed with a threaded hole 20 radially passed through the main part 12. A retaining screw 22 is threaded into the threaded hole 20 such that a columnar projection formed at the free end 24 of the retaining screw 22 is slidably received in the circumferential groove 34. This retaining screw 22 may be substituted with any other retaining member that allows the relative rotation between the first and second members 10 and 30 while preventing an axial movement of these two members away from each other.

Thus, the second member 30 is prevented from being pulled away from the first member 10 while being disposed coaxially with the first member 10 in a relatively rotatable manner. The second member 30 is generally cylindrical in shape, and is provided with the fitting shaft portion 32, the disk supporting shaft portion 36 and a thread forming shaft portion 38 axially in that order.

The thread forming shaft portion 38 is formed in the other end portion (left end as seen FIG. 4) of the second member 30, and is provided with a smaller outer diameter than the disk supporting shaft portion 36. The outer circumferential surface of the thread forming shaft portion 38 is formed with a male thread 40, and the inner circumferential surface thereof is formed with a female thread 42 serving as a thread of a fastening nut.

Figure 1:
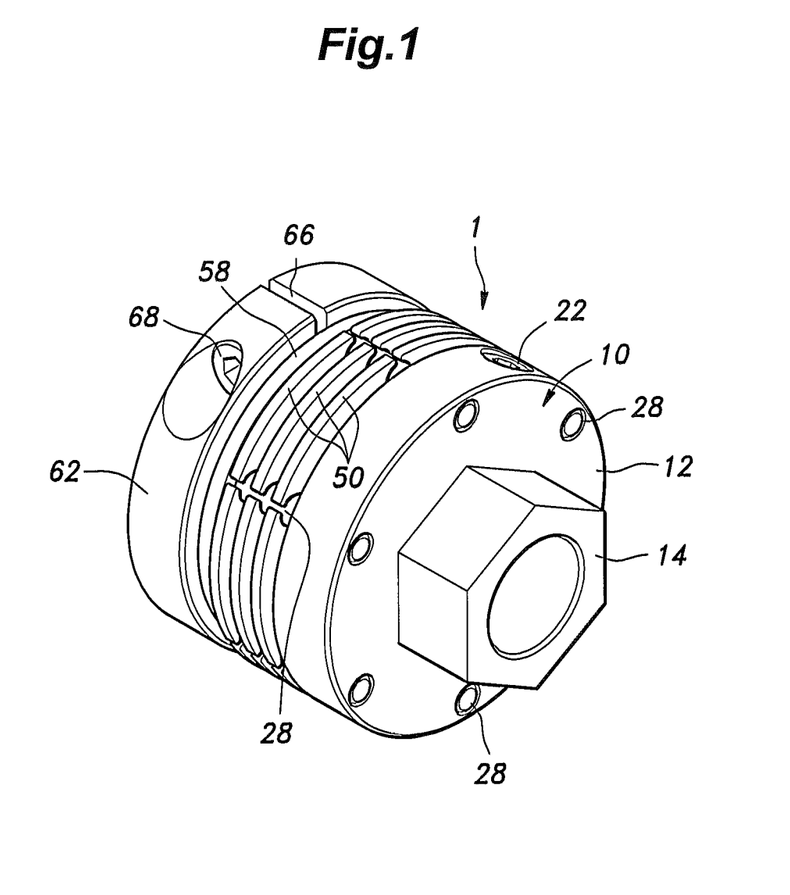
FIG. 1 is perspective view of an embodiment of the screw fastener (nut) according to the present invention.
Figure 2:
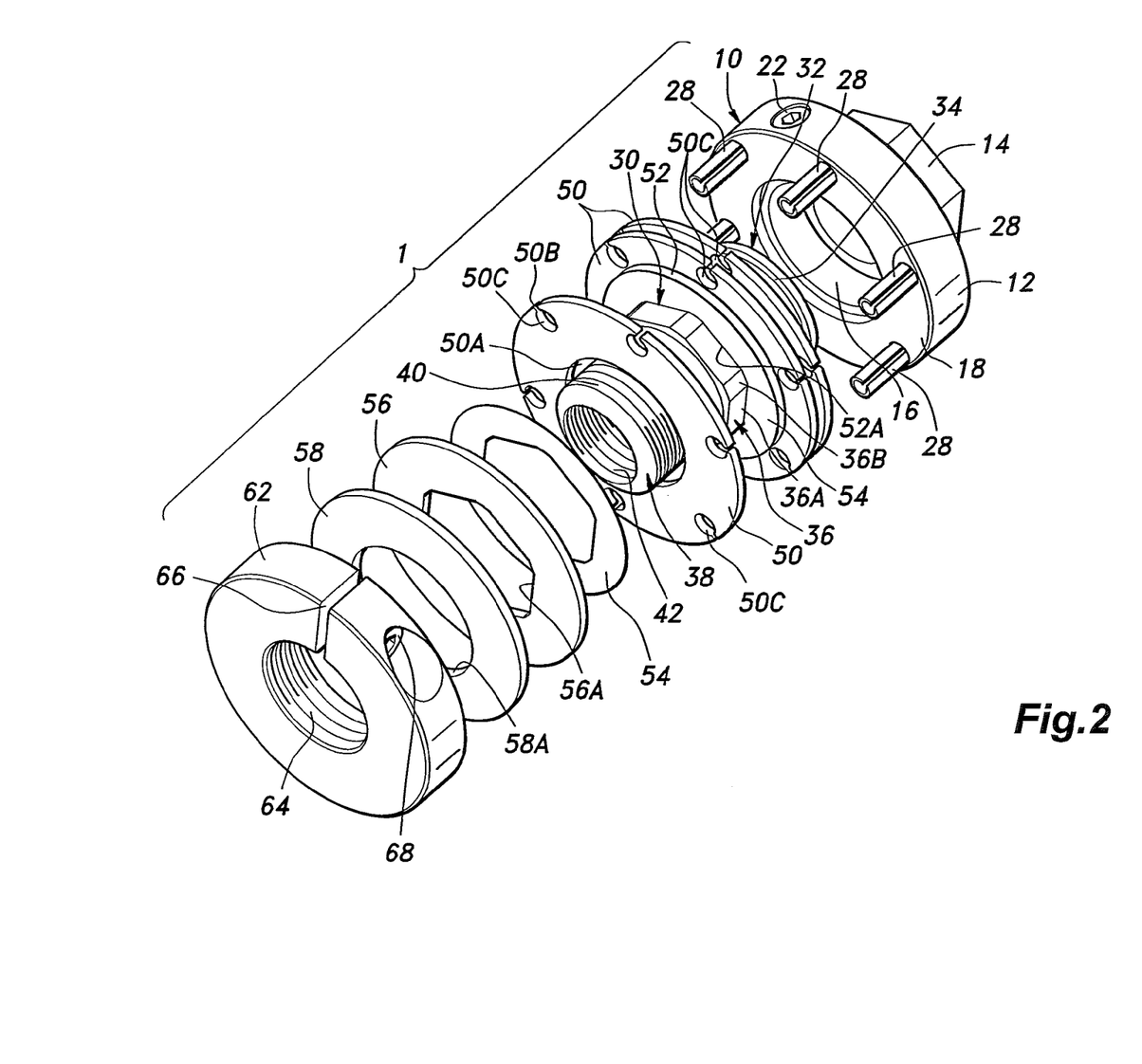
FIG. 2 is an exploded perspective view of the nut embodying the present invention.
Figure 3:
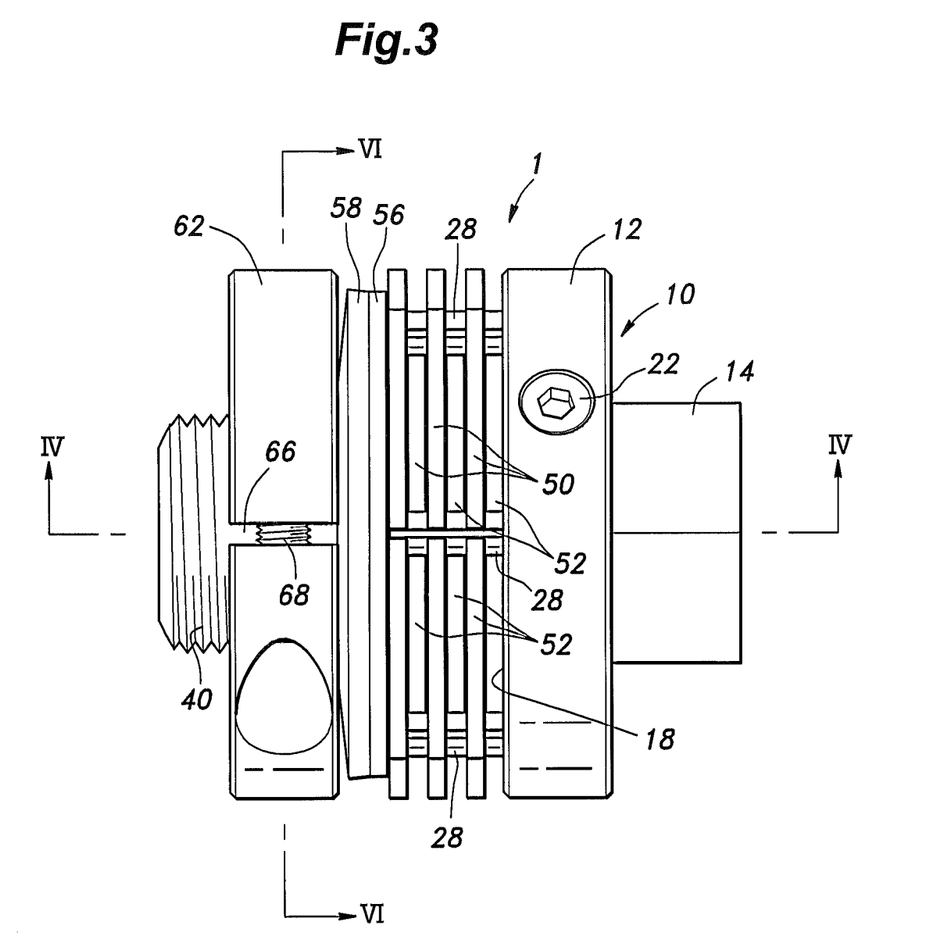
FIG. 3 is a side view of the nut embodying the present invention.

The disk supporting shaft portion 36 is located between the fitting shaft portion 32 and the thread forming shaft portion 38, and is shaped as a hexagonal shaft portion 36A that can be detachably engaged by the same nut turning tool as that used for engaging the tool engaging feature 14 as shown in FIG. 2. The hexagonal shaft portion 36A is substantially identical in shape to the tool engaging feature 14 except for that each corner of the hexagonal shaft portion 36A is rounded so as to define an arc 36B defining a part of a circle concentric to the disk supporting shaft portion 36.

A plurality of drive disk members 50 and a plurality of driven disk members 52 are fitted on the outer circumferential surface of the disk supporting shaft portion 36 in an axially slidable manner so as to axially alternate with one another.

Each drive disk member 50 is formed with a central hole 50A, and is fitted on the arcs 36B of the disk supporting shaft portion 36 in an axially slidable and rotatable manner via the central hole 50A. Thereby, each drive disk member 50 is rotatable and axially slidable with respect to the second member 30.

The outer peripheral part of each drive disk member 50 is formed with six holes 50C passed axially through the drive disk member 50 at a regular angular interval, and each hole 50C is connected to the outer edge of the drive disk member 50 via a radial slit 50B. Each hole 50C receives the corresponding spring pin 28 in an axially slidable manner so that each drive disk member 50 is rotationally fast and axially slidable with respect to the first member 10. In other words, each drive disk member 50 rotates jointly with the first member 10.

Each driven disk member 52 is formed with a central hole 52A having a hexagonal shape, and is fitted on the hexagonal shaft portion 36A in an axially slidable manner via the central hole 52A so that each driven disk member 52 is rotationally fast and axially slidable with respect to the second member 30. In other words, each driven disk member 52 rotates jointly with the second member 30.

The outer diameter of the driven disk member 52 is smaller than that of the drive disk member 50 so that the driven disk member 52 is radially spaced from the spring pins 28, and do not interfere with the spring pins 28.

Figure 5:
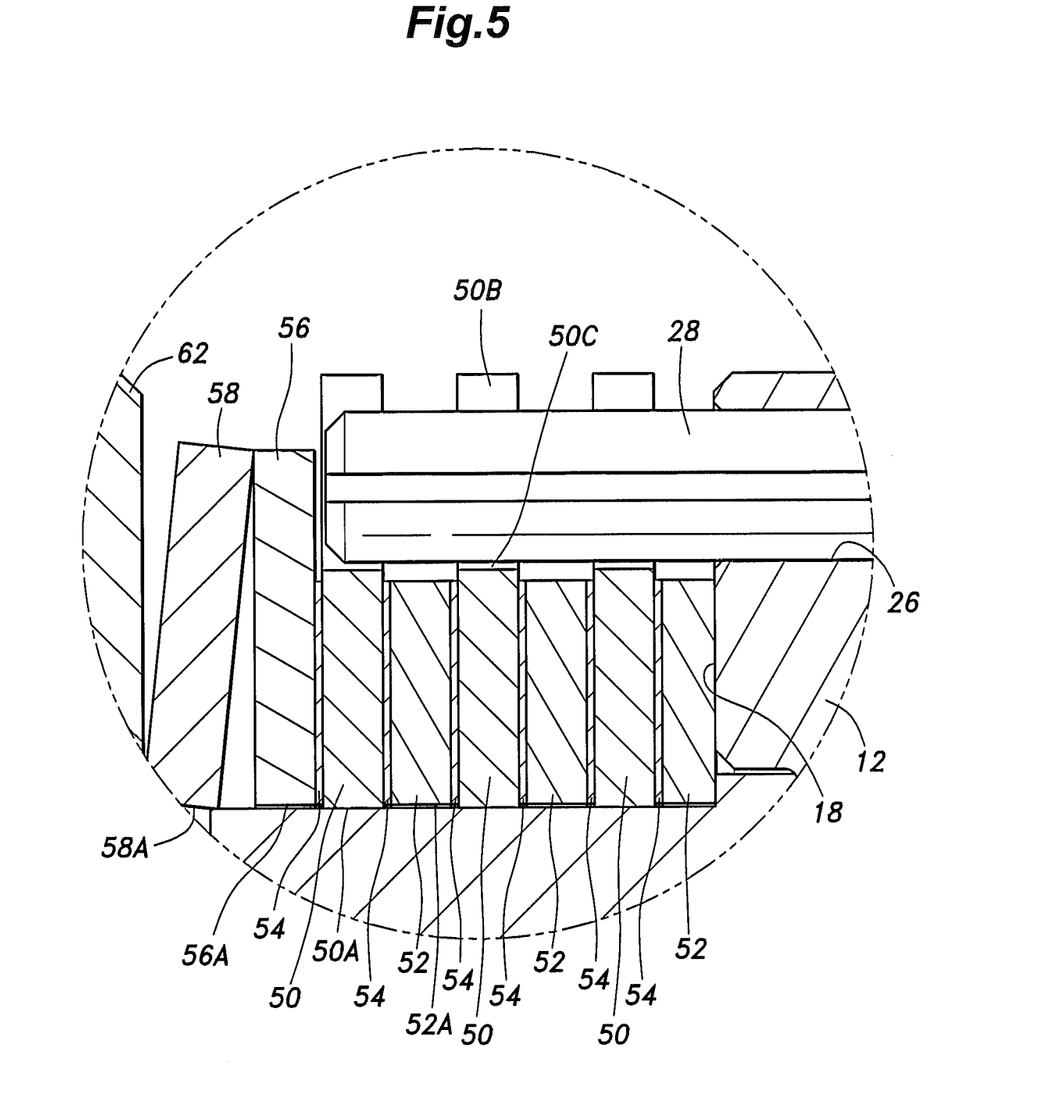
FIG. 5 is an enlarged sectional view of the part of FIG. 4 indicated by letter A.
Figure 6:
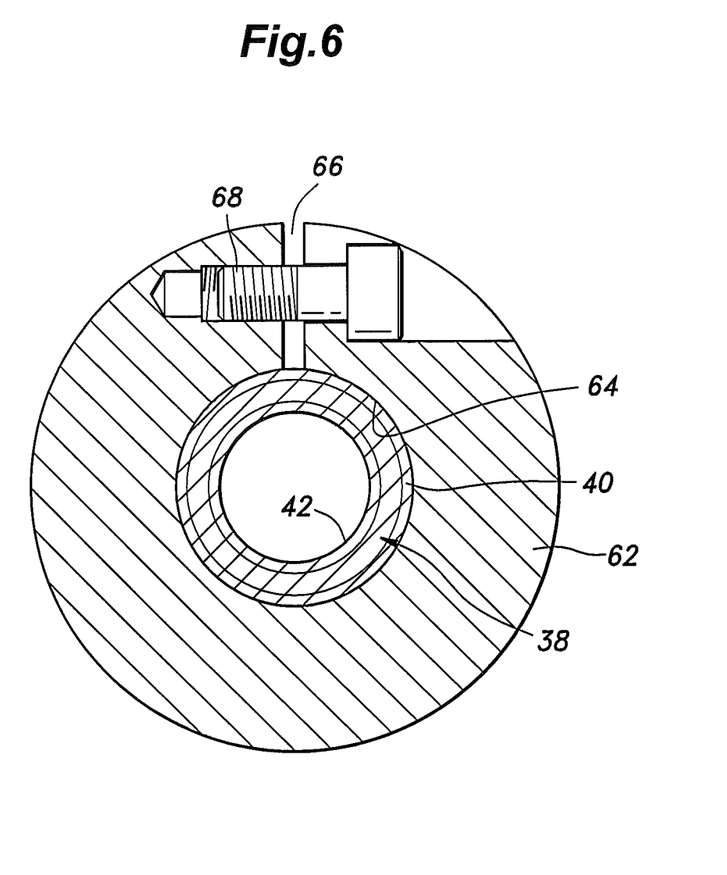
FIG. 6 is a sectional view of the embodiment taken along line VI-VI of FIG. 3.

The drive disk members 50 and the driven disk members 52 are made of common steel sheet stock. The sides of the driven disk members 52 that engage the opposing surfaces of the drive disk members 50 are provided with a thin sheet 54 made of more corrosion resistant (in particular, rust-proof) material than the material of the drive disk member 50 and the driven disk member 52, such as stainless steel, as shown in FIG. 5.

One of the driven disk members 52 occupies the position axially closest to the annular end surface 18 of the first member 10, and one of the drive disk members 50 is placed next thereto. The remaining drive disk members 50 and driven disk members 52 are arranged in an alternating manner, and a pressure plate 56 and an annular dish spring 58 are arranged in that order on the side adjoining the thread forming shaft portion 38.

The pressure plate 56 is formed with a hexagonal central hole 56A so as to axially slidably fit onto the hexagonal shaft portion 36A via the hexagonal central hole 56A. Thus, similarly as the driven disk members 52, the pressure plate 56 is rotationally fast and axially slidable to the second member 30. In other words, the pressure plate 56 rotates jointly with the second member 30.

The pressure plate 56 is also made of common steel sheet stock. The surface of the pressure plate 56 that engages the opposing surface of the drive disk member 50 is provided with a thin sheet 54 made of more corrosion resistant (in particular, rust-proof) material than the material of the pressure plate 56, such as stainless steel, as shown in FIG. 5.

The dish spring 58 is formed with a hexagonal central hole 58A so as to be fitted onto the arcs 36B of the disk supporting shaft portion 36 in an axially slidable and rotatable manner via the central hole 58A. Thereby, the dish spring 58 is rotatable and axially slidable with respect to the second member 30. The dish spring 58 urges the drive disk members 50 and the driven disk members 52 against the annular end surface 18 of the first member 10 via the pressure plate 56.

The male thread 40 is threadably engaged by a female thread 64 formed on the inner circumferential surface of an annular spring retainer 62. As the spring retainer 62 is threaded onto the male thread 40, the spring retainer 62 is displaced toward the dish spring 58, and applies a preloading to the dish spring 58. The preload of the dish spring 58 can be adjusted by turning the spring retainer 62 in the corresponding direction.

The spring retainer 62 is formed with a slit 66 that provides a radial cut in the annular shape thereof. A retaining screw 68 is passed into the spring retainer 62 across the slit 66 thereof so that the slit 66 may be narrowed by the threading of the retaining screw 68. By undergoing an elastic deformation by the retaining screw 68, the spring retainer 62 can be fixed onto the thread forming shaft portion 38 at any desired axial position of the male thread 40.

Thus, a multi-plate torque limiter is formed between the first member 10 and the second member 30 by the drive disk members 50, the driven disk members 52, the pressure plate 56, the dish spring 58 and the spring retainer 62.

The limit torque (maximum fastening torque) of this torque limiter is determined by the magnitude of the preloading applied to the dish spring 58. When the first member 10 is turned by a turning tool (not shown in the drawings) engaging the tool engaging feature 14 with a torque less than the limit torque, the rotation of the first member 10 is transmitted to the second member 30 via the spring pins 28 and the frictional engagement between the drive disk members 50 and the driven disk members 52 so that the second member 30 turns jointly with the first member 10.

As the threading of the female thread 42 on the male thread of a bolt (not shown in the drawings) progresses with the nut 1 being fastened, the torque required to turn the first member 10 increases. When this torque has reached the limit torque of the torque limiter, the drive disk members 50 start slipping relative to the driven disk members 52 so that the second member 30 ceases to rotate jointly with the first member 10. As a result, turning the first member 10 relative to the second member 30 with an excessive fastening torque can be avoided.

The limit torque of the torque limiter can be continuously varied by turning the spring retainer 62 relative to the thread forming shaft portion 38.

In this torque limiter, because the frictional surfaces of the drive disk members 50, the driven disk members 52 and the pressure plate 56 are defined by the thin sheets 54 having a high corrosion resistance property, the seizure of the frictional surfaces owing to rusting can be avoided without requiring any expensive arrangements such as the use of oil impregnated metals.

As the torque limited incorporated in the nut 1 employs a plurality of the disks, a large frictional surface area can be obtained without increasing the diameter of the frictional surfaces between the drive disk members 50 and the driven disk members 52 so that a high limiting torque can be achieved without increasing the outer diameter of the torque limiter or increasing the spring biasing force of the dish spring 58.

The engagement between the drive disk members 50 and the first member 10 for torque transmission is achieved by the through holes 50C formed in the outer periphery of the drive disk members 50 and the spring pins 28 received therein, instead of a spline formed on the outer peripheral edge of the drive disk members 50 and a corresponding spline formed on the inner circumferential wall of the outer case, and this also contributes to the minimization of the outer diameter of the torque limiter.

This nut 1 can be assembled as described in the following. With the second member 30 joined to the first member 10 by using the retaining screw 22, the drive disk members 50 and the driven disk members 52 are fitted on the outer circumference of the disk supporting shaft portion 36 in an alternating manner, and the pressure plate 56 and the dish spring 58 are then fitted thereon. The spring retainer 62 is threaded with the male thread 40 until a required limit torque is achieved, and is fixedly secured to the thread forming shaft portion 38 by tightening the retaining screw 68.

An alternate assembling process of the nut is described in the following. While first member 10 is not still joined to the second member 30, the drive disk members 50 and the driven disk members 52 are fitted on the outer circumference of the disk supporting shaft portion 36 in an alternating manner, and the pressure plate 56 and the dish spring 58 are then fitted thereon. The spring retainer 62 is threaded with the male thread 40 until a required limit torque is achieved, and is fixedly secured to the thread forming shaft portion 38 by tightening the retaining screw 68. By treating this as a sub assembly, the fitting shaft portion 32 of the second member 30 is fitted into the central receiving bore 16 of the first member, and the second member 30 is joined to the first member by threading the retaining screw 22 into the threaded hole 20.

The drive disk members 50, the driven disk members 52 and the pressure plate 56 are prevented from coming off from the disk supporting shaft portion 36 at the fitting shaft portion 32 side thereof while they are joined to one another as a sub assembly owing to the presence of a projection 36C provided on the outer periphery of the part of the disk supporting shaft portion 36 adjoining the fitting shaft portion 32. The annular main part 12 of the first member 10 is provided with a recess for receiving the projection 36C, and thereby allowing the annular end surface 18 to provide a flush contact surface to the opposing driven disk member 52.

Owing to this arrangement, the second member 30 can be handled as a sub assembly by being combined with the drive disk members 50, the driven disk members 52, the pressure plate 56, the dish spring 58 and the spring retainer 62 so that the assembling efficiency of the nut 1 incorporated with the torque limiter can be improved.

Disassembling of the nut 1 can be accomplished by reversing the assembling process. In particular, simply by unfastening the retaining screw 22, the first member 10 and the second member 30 can be readily separated so that the servicing efficiency can be also improved.

Should the female thread 42 of the nut 1 seize owing to rusting, and a torque exceeding the limit torque is required to unfasten the nut 1, the second member 30 may not be turned by turning the first member 10 owing to the slipping of the torque limiter.

In such a case, the retaining screw 68 is unfastened, and the spring retainer 62 is unscrewed such that the drive disk members 50, the driven disk members 52, the pressure plate 56 and the dish spring 58 are pushed aside toward the thread forming shaft portion 38. By thus exposing the hexagonal shaft portion 36A, the hexagonal shaft portion 36A may be engaged by a tool such as a wrench so that the second member 30 and hence the nut 1 may be turned in the unscrewing direction with the tool. Thus, the hexagonal shaft portion 36A serves the dual purposes of preventing the rotation of the driven disk members 52 and engaging a tool for directly turning the second member 30.

The tool for engaging the hexagonal shaft portion 36A may be essentially the same as the tool used for engaging the tool engaging feature 14 so that there is no need to use two different tools for these purposes.

If there is no projection 36C on the outer periphery of the end portion of the fitting shaft portion 32, the hexagonal shaft portion 36A can be exposed simply by unfastening the retaining screw 22 to separate the first member 10 and the second member 30 from each other, and removing the drive disk members 50 and the driven disk members 52 from the side of the fitting shaft portion 32.

Figure 7:
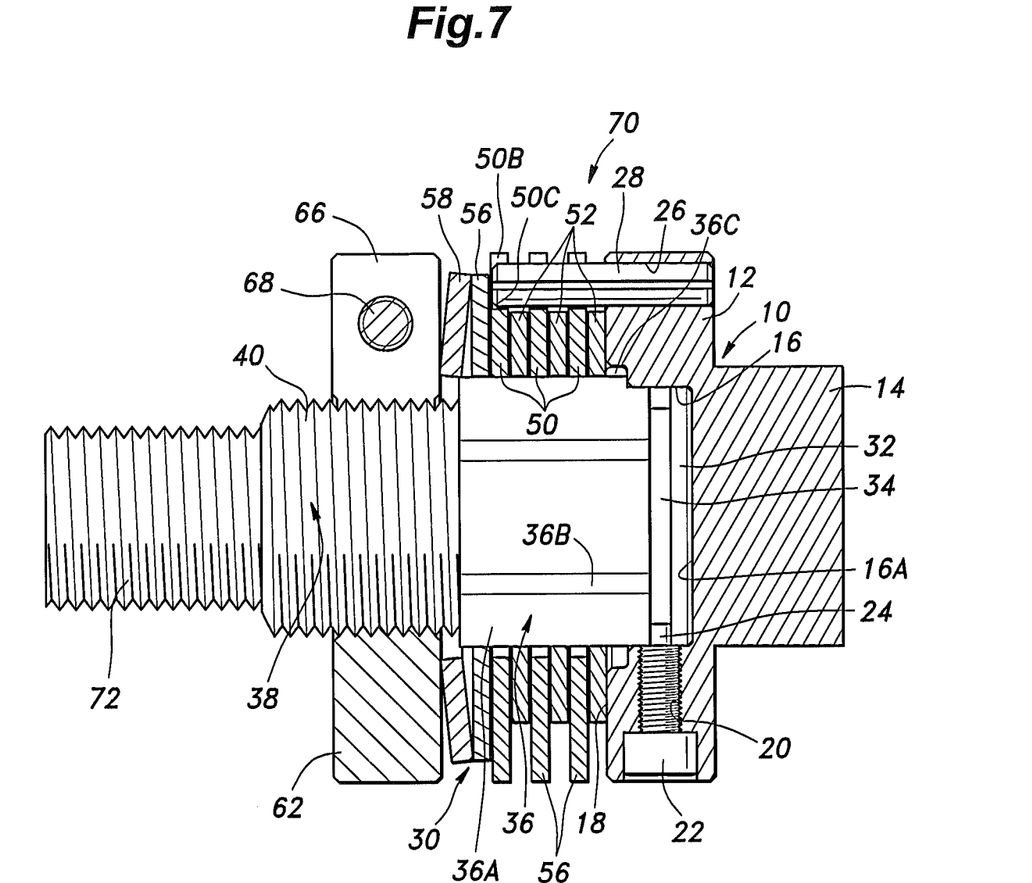
FIG. 7 is a sectional view of an alternate embodiment of the screw fastener (bolt) according to the present invention.

An embodiment implementing the present invention as a bolt is described in the following with reference to FIG. 7. In FIG. 7, the parts corresponding to those shown in FIG. 4 are denoted with like numerals without repeating the description of such parts.

In this embodiment, the second member 30 consists of a sold shaft member, and is formed with a male thread 72 in the free end portion thereof as a fastening screw in the form of a bolt, instead of the female thread 42. Otherwise, this embodiment is similar to the nut 1 or the first embodiment.

The bolt 70 of the illustrated embodiment operates similarly as the nut 1, and provides similar advantages.

Although the present invention has been described in terms of a preferred embodiment thereof, it is obvious to a person skilled in the art that various alterations and modifications are possible without departing from the scope of the present invention.

For instance, the tool engaging feature is not limited to the hexagonal head, but may also consist of a rectangular or other polygonal head, or a polygonal recesses.

The thin sheets 54 may be arranged on the two sides of each drive disk member 50 or the two sides of both the drive disk members 50 and the driven disk members 52. As a matter of fact, it suffices if at least one of the two surfaces of the drive disk members 50 and the driven disk members 52 that engage each other is provided with a layer of material having a higher corrosion resistance than the material of the disk members. The use of such thin sheets or layers are not essential to the present invention.

The retaining screw 22 that is used for joining the first and second members 10 and 30 to each other may not be single, but a plurality of retaining screws 22 may be used at a regular interval along the circumferential direction. It is also possible to use other forms of retaining member to join joining the first and second members so as to be rotatable to each other while preventing an axial relative movement between them such as a circular clip or any other detachable retaining member. The spring pins 28 may be replaced by solid pins or tubular pins. The dish spring 58 may be substituted by a compression coil spring or a rubber spring.

When there is no need to separate the first and second members 10 and 30 from each other, instead of the retaining screw 22, a spring pin or other pin member may be used for joining the first and second members 10 and 30 to each other in a relatively rotatable manner. The projection 36C may be omitted, and the snap ring or the like may be detachably placed therein, instead of providing the projection 36C.

The contents of the original Japanese patent application on which the Paris Convention priority claim is made for the present application as well as the contents of the prior art references mentioned in this application are incorporated in this application by reference.

The invention claimed is:
1. A screw fastener, comprising:
  a first member provided with a tool engaging feature for engaging a turning tool on an axial end, a central receiving bore opening out at an opposite axial end and an annular end surface surrounding an open end of the central receiving bore;

a tubular second member rotatably received in the central receiving bore, and having a fitting shaft portion at an axial end thereof formed with a circumferential groove on an outer circumference thereof and a male thread formed in an opposite axial end thereof, the opposite axial end of the second member being further provided with a fastening thread thereon, a disk supporting shaft portion being formed on the second member between the fitting shaft portion and the male thread;

a retaining member partly received in the circumferential groove on the outer circumference of the fitting shaft portion and engaged by the first member;

a rod member fixed to the first member and extending axially toward the second member;

a plurality of drive disk members fitted on the outer circumferential surface of the disk supporting shaft portion in an axially slidable and rotatable manner and having a through hole for axially passing the rod member therethrough;

a plurality of driven disk members fitted on the outer circumferential surface of the disk supporting shaft portion in an axially slidable and rotationally fast manner so as to axially alternate with the drive disk members;

a spring member disposed on the outer circumferential surface of the disk supporting shaft portion to urge the drive disk members and the driven disk members toward the annular end surface of the first member; and a spring retainer threadably engaged by the male thread of the second member to apply a preload to the spring member.

2. The screw fastener according to claim 1, wherein the retaining member comprises a retaining screw threaded into a threaded hole passed radially through the first member and having a free end slidably received in the circumferential groove.

3. The screw fastener according to claim 1, wherein the tool engaging feature comprises a polygonal head, and the disk supporting shaft portion includes a polygonal shaft portion having a polygonal cross section which is conformal to the polygonal head so as to be engageable by a same tool as the polygonal head, the driven disk members being held rotationally fast by the second member by being fitted onto the polygonal shaft portion.

4. The screw fastener according to claim 1, wherein a thin sheet or a coating having a higher corrosion resistance than the material of the drive disk members and the driven disk members is placed on at least one of surfaces at which the drive disk members and the driven disk members come to contact with each other.

5. The screw fastener according to claim 1, wherein the fastening thread provided on the second member comprises a female thread formed in a central bore formed on the opposite axial end of the second member.

6. The screw fastener according to claim 1, wherein the fastening thread provided on the second member comprises a male thread formed on an axial extension formed on the opposite axial end of the second member.

7. The screw fastener according to claim 1, wherein a disk retaining feature is provided on an outer periphery of a part of the disk supporting shaft portion adjoining the fitting shaft portion to retain the drive and driven disk members against axial movement thereof toward the fitting shaft portion.

\* \* \* \* \*